April 15, 1958 H. KASPEROWICZ 2,830,915
PROCESS FOR FORMING LUMINESCENT SCREENS
Filed April 18, 1955
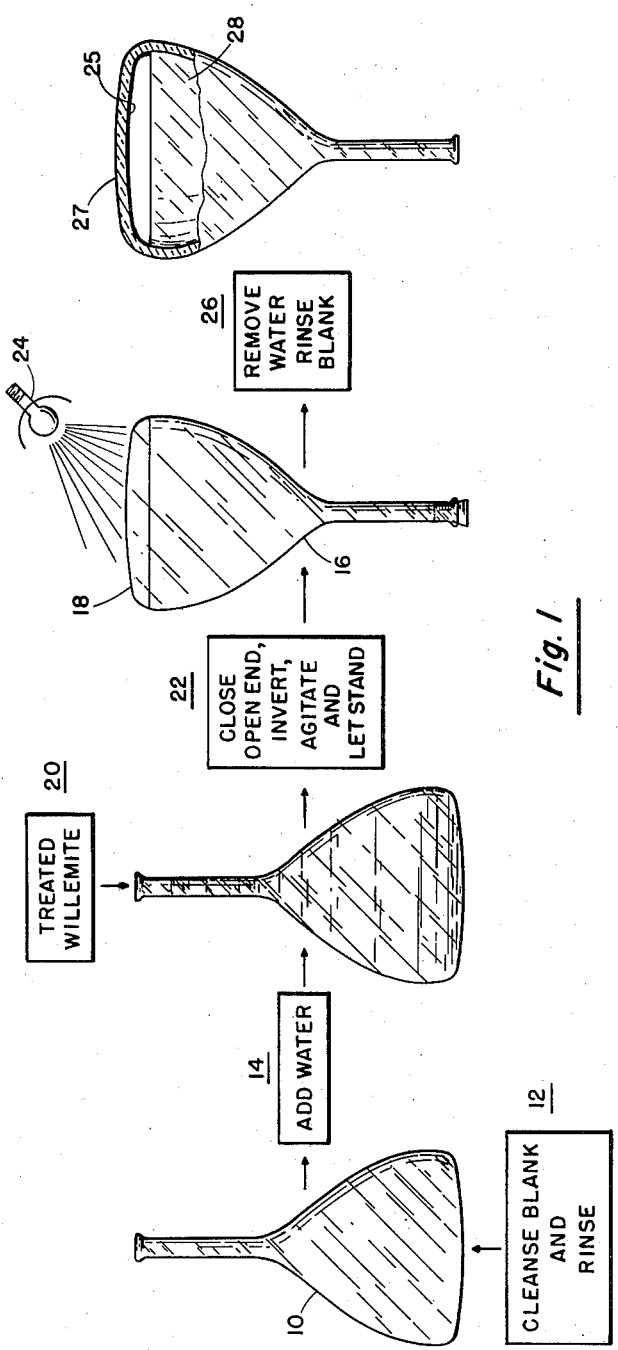
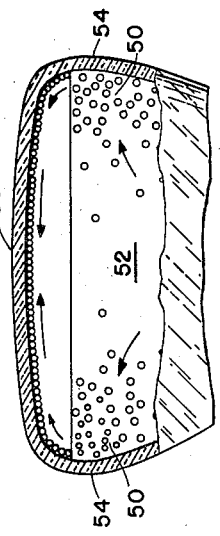
INVENTOR.
HENRY KASPEROWICZ
BY Darby & Darby
ATTORNEYS

2,830,915

PROCESS FOR FORMING LUMINESCENT SCREENS

Henry Kasperowicz, Clifton, N. J., assignor to Allen B. du Mont Laboratories, Inc., Clifton, N. J., a corporation of Delaware Application April 18, 1955, Serial No. 502,233

7 Claims. (Cl. 117—18)

The present invention relates to a coating process and more particularly to a new and improved process for forming luminescent screens on supporting surfaces.

This application is a continuation-in-part of my copending application Serial No. 248,277, now abandoned.

It is well known in the cathode ray tube art that the efficiency of luminescence of screens depends upon the type of luminescent material used and upon the physical character of the screen itself. In this connection and particularly when concerned with flat display devices of the "picture on the wall" type, it is considered desirable that such a screen approach as near as possible a mono-particle layer of luminescent particles on a supporting surface with the individual particles interlaced and compacted in the layer to prevent voids in the screen. The common methods of applying luminescent screens to supporting surfaces such as flowcoating, spraying, and settling of luminescent particles through colloidal solutions have not been entirely satisfactory in accomplishing this end.

Accordingly, it is an object of the present invention to provide a process for forming improved screens of luminescent particles having a high degree of efficiency.

It is a further object of the present invention to provide a simple, inexpensive process for forming monoparticle thickness screens of luminescent materials on supporting surfaces.

It is still a further object of the present invention to provide a simple and inexpensive process for forming mono-particle thickness luminescent screens on cathode ray tubes.

The features of my invention which I believe to be novel are set forth with particularity in the appended claims. My novel process itself, however, both as to its organization and operation, together with further objects and advantages therewith, may best be understood by reference to the following description taken in conjunction with the accompanying drawings in which, Fig. 1 represents a partial schematic and flow chart representation of my novel process; and Fig. 2 represents a partial cross-sectional view of a tube blank in the process of being coated.

These and other objects are accomplished in accordance with this invention by forming a vessel or container having a surface which is to be utilized as a supporting surface for a screen of luminescent particles, introducing into the vessel predetermined amounts of liquid and luminescent particles which are not wettable by the liquid, i. e., is liqui-phobic with respect to the liquid, and positioning the vessel with the entrapped materials so that the screen supporting surface and the surface of the liquid are mutually exposed. Under such conditions, I have found that the luminescent particles will flow freely from the surface of the liquid and along the uncovered walls of the vessel to form a compact screen substantially one particle in thickness across the screen supporting surface of the vessel. While this phenomenon (which forms the basis of the screen coating process of the present invention) is not thoroughly understood, it is believed to be caused by the repellency which the luminescent particles have for the liquid employed to float them, causing the particles to move radially outwardly on the surface of the liquid and along the exposed wall portions until the surfaces of the exposed wall portions are completely and compactly covered by a uniform, mono-particulate layer of luminescent screen. Water has been successfully employed as an inexpensive, easily obtainable liquid carrier for the particles. Where water is used as the liquid for carrying the luminescent particles, I have found that hydrophobic properties may be imparted to the luminescent particles by treating them with a hydrophobic material such as the silicone compounds, waxes as beeswax candelilla and carnauba wax and such resins as the polystyrene and vinyl chloride compounds.

The process of my invention may be utilized with any of the fluorescent, phosphorescent or tenebrescent materials, commonly employed in making luminescent screens, such materials, including sulphides, silicates, phosphates, tungstates, borates, oxides, and fluorides in the form of such compounds as zinc ortho-silicate, zinc phosphate, calcium silicate, zinc beryllium silicate, zinc sulphide, calcium tungstate, cadmium borate, zinc oxide, and magnesium fluoride.

As a specific example of how I utilize the process of my invention to deposit luminescent screens on supporting surfaces, I have employed a conventional cathode ray tube blank (10) having a 5″ diameter face or screen supporting surface and a volume of substantially 2430 cc. As a first step, the interior of the tube blank was thoroughly cleansed (12) with a substantially 5% aqueous ammonium bifluoride solution, rinsed with distilled water to condition the interior walls of the blank to receive a coating of luminescent material and dried. Into the vessel, there was added substantially 2300 cc. of water (14), which volume is sufficient, when the blank was closed and properly positioned (16), to mutually expose the surface of the blank to be coated to the surface of the liquid therein, and leave substantially one quarter to one half inch of air space 18 therebetween. In this connection, I have found that in a tube blank of this size, an air space of substantially this spacing between the mutually exposed surfaces is desirable to facilitate the flow of the luminescent particles from the surface of the liquid along the exposed walls of the blank and across the surface of the blank to be coated. It will be obvious that with tube blanks of different volume, a volume of water in suitable ratio to the volume of the blank will be desirable to provide adequate space above the liquid. In this connection it has been found that the best results would be obtained when the volume of water introduced into the blank is from about 75% to 97% of the capacity of the blank.

After the proper amount of water (14) has been introduced into the blank, approximately 3 grams of a powder synthetic hydrophobic willemite 20 is added. Willemite is a zinc ortho silicate compound having a particle size ranging from about .05 to 5.0 microns. The willemite has previously been treated with a silicone compound such as dichlordimethylsilane, to impart hydrophobic or water repellent characteristics to the willemite. After the introduction of the water and hydrophobic willemite into the tube blank, the neck of the blank is closed and the suspension therein is agitated to separate any agglomerate of willemite particles. Thereafter, the blank is inverted (22) to expose a large surface of the liquid to the surface of the blank to be coated. Immediately upon inversion, the willemite particles collect on the surface of the liquid and because of their hydrophobic or water repellent characteristics, move outwardly along the surface of the water, upwardly along the exposed wetted walls of the blank and thereafter radially inwardly along the wetted screen supporting faceplate of the blank until a compact uniform mono-particulate layer is formed on the surface. This is shown in detail in Fig. 2 wherein particles 50 move through water 52, up side walls 54 and across faceplate 56 in the direction indicated by the arrows.

In this connection, I have found that best results in obtaining uniform layer thickness of the screen are accomplished by proportioning the quantity of the hydrophobic luminescent particles to the volume of air space entrapped between the surface of the liquid and the faceplate of the blank. If the quantity of luminescent particles is too small relative to this space, the screen layer may not be as compact as desirable thereby leaving voids which reduce the efficiency of the screen. On the other hand, too large a quantity of fluorescent particles with respect to the space between the mutually exposed surfaces may cause an overlapping of particles thereby precluding uniformity of screen thickness and reducing the efficiency of the luminescent screen. In the example hereinabove described, it was found that three grams of willemite treated with the dichlordimethylsilane, to impart water repellent characteristics thereto, provided excellent results where the air space in the vessel was substantially 130 cc. As previously noted, this volume corresponds approximately to an air space of about one quarter to one half inch. A similar ratio may be successfully employed in vessels of different sizes.

In imparting the hydrophobic characteristics to the luminescent material, I have found that excellent water repellent characteristics were imparted to the willemite particles when the dichlordimethylsilane was added directly to the willemite in the ratio of substantially one part by weight of dichlordimethylsilane to 250 parts, by weight, of willemite. In imparting water repellent characteristics to the luminescent materials with other of the water repellent materials heretofore described, such materials being in the form of solids, they may be added to the luminescent particles and milled in a ball milling machine or other suitable tumbling device to provide the particles with a water repellent coating. In this connection, I have observed that the addition of the water repellent material in the form of a coating on the luminescent particles does not react with the luminescent materials to impart any detrimental luminescent characteristics thereto.

With the blank containing the water and treated willemite having formed a layer or coating on the exposed surfaces of faceplate and liquid, and the luminescent particles having formed a layer or coating on the exposed surfaces of the blank, the blank and coating is exposed to heat such as from an infra-red ray lamp 24 for a sufficient period of time to secure the coating 25 to the surface 27. Thereafter, the remaining willemite particles and water are removed by draining and the tube blank is rinsed and dried (26). In this condition, the tube blank 28 is ready for assembly with an electron gun structure to provide a cathode ray tube.

The process which I have described hereinabove provides a luminescent coating of a high degree of efficiency in a manner which permits relatively easy control of thickness and compactness of the luminescent screen, and its simplicity and inexpensiveness permits accomplishment of such coatings in relatively short periods of time, thereby making the process highly desirable in the manufacturing of cathode ray tubes.

While I have described my process in terms of depositing a screen on the inner surface of a cathode ray tube faceplate it will be obvious to those skilled in the art that its application may be extended to any surface which presents a luminescent display.

What is claimed is:

1. A method of coating a surface with particles comprising the steps of: providing a vessel having a support surface on which said particles are deposited, introducing into said vessel a predetermined quantity of liquid less than the volume of said vessel to define a limited space between said support surface and the free surface of said liquid, the distance from said support surface to said free surface being from ¼ to ½ inch measured along a side wall of the vessel, wetting said support surface, introducing into said vessel particles not readily wettable by said liquid, said particles rising to the free surface of said liquid and migrating over the surface of said liquid and over the wetted support surface to form a monoparticle layer on said wetted support surface, said particles ranging in size from about .05 to about 5.0 microns, and removing the body of said liquid from said vessel.

2. A method of depositing a screen of luminescent particles comprising the steps of: providing a vessel having a surface to support said screen, introducing into said vessel a predetermined quantity of liquid less than the volume of said vessel to define a limited space between said supporting surface and the free surface of said liquid, the distance from said support surface to said free surface being from ¼ to ½ inch measured along a side wall of the vessel, wetting said support surface, introducing into said vessel solid luminescent particles not readily wettable by said liquid, said particles ranging in size from about .05 to 5.0 microns, said luminescent particles rising to the free surface of said liquid and migrating over the surface of said liquid and over the wetted supporting surface to form a monoparticle layer on said wetted support surface and removing the body of said liquid from said vessel.

3. A method in accordance with claim 2 in which said liquid is an aqueous medium.

4. A method in accordance with claim 3 in which the deposited luminescent screen is baked to secure it to said support surface following its deposition.

5. A method of forming a luminescent screen on a supporting surface which comprises the steps of: providing a vessel having a surface to be coated, introducing into said vessel a volume of liquid less than the volume of said vessel, wetting the said surface, orienting said vessel to maintain said wetted surface above the free surface of the liquid, and introducing into the body of the liquid a luminescent material not readily wettable by said liquid, said luminescent material ranging in size from about .05 to about 5.0 microns, whereby said luminescent material collects on the surface of said liquid and spreads thereover onto the exposed surface of said vessel to form a layer of particles on said surface, and removing the body of said liquid.

6. A method in accordance with claim 5 in which the liquid is water.

7. A method in accordance with claim 6 wherein the luminescent material forming the screen is baked in place before removal of the body of liquid.

References Cited in the file of this patent

UNITED STATES PATENTS

| | | |
|---|---|---|
| 2,096,416 | Weinhart | Oct. 19, 1937 |
| 2,151,496 | Beese | Mar. 21, 1939 |
| 2,223,830 | Leverenz | Dec. 3, 1940 |
| 2,633,426 | Koller | Mar. 31, 1953 |
| 2,662,829 | Krause | Dec. 15, 1953 |

U. S. DEPARTMENT OF COMMERCE
PATENT OFFICE
CERTIFICATE OF CORRECTION

Patent No. 2,830,915              April 15, 1958

Henry Kasperowicz

It is hereby certified that error appears in the printed specification of the above numbered patent requiring correction and that the said Letters Patent should read as corrected below.

Column 3, line 51, strike out "having formed a layer or coating on the" and insert instead --mite in a position providing mutually--.

Signed and sealed this 3rd day of June 1958.

(SEAL)
Attest:
KARL H. AXLINE

Attesting Officer

ROBERT C. WATSON
Commissioner of Patents